United States Patent
Park et al.

(10) Patent No.: US 10,892,484 B2
(45) Date of Patent: Jan. 12, 2021

(54) COBALT OXIDE FOR LITHIUM SECONDARY BATTERY, PREPARING METHOD THEREOF, LITHIUM COBALT OXIDE FORMED FROM THE COBALT OXIDE, AND LITHIUM SECONDARY BATTERY HAVING POSITIVE ELECTRODE INCLUDING THE LITHIUM COBALT OXIDE

(71) Applicant: SAMSUNG SDI CO., LTD., Yongin-si, Gyeonggi-do (KR)

(72) Inventors: Junseok Park, Yongin-si (KR); Seonyoung Kwon, Yongin-si (KR); Jihyun Kim, Yongin-si (KR); Jinhwa Kim, Yongin-si (KR); Dohyung Park, Yongin-si (KR); Daehoe Lee, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 33 days.

(21) Appl. No.: 15/702,048

(22) Filed: Sep. 12, 2017

(65) Prior Publication Data
US 2018/0076454 A1  Mar. 15, 2018

(30) Foreign Application Priority Data

Sep. 13, 2016 (KR) .................. 10-2016-0118208
Sep. 11, 2017 (KR) .................. 10-2017-0115909

(51) Int. Cl.
*H01M 4/13* (2010.01)
*H01M 4/525* (2010.01)
(Continued)

(52) U.S. Cl.
CPC .......... *H01M 4/525* (2013.01); *H01M 4/0497* (2013.01); *H01M 4/52* (2013.01);
(Continued)

(58) Field of Classification Search
CPC ...... H01M 4/525; H01M 4/0497; H01M 4/52; H01M 10/052; H01M 10/0525; H01M 2004/028
See application file for complete search history.

(56) References Cited

U.S. PATENT DOCUMENTS 7,998,452 B2    8/2011  He
8,962,508 B2 *  2/2015  Heidemann .......... B01J 29/7007
                                                502/260
(Continued)

FOREIGN PATENT DOCUMENTS

CN    1623909 A    6/2005
CN    101066781 A  11/2007
(Continued)

OTHER PUBLICATIONS

Office Action issued by the Chinese Patent Office dated Jan. 30, 2019 in the examination of the Chinese Patent Application No. 201710821892.5.
(Continued)

*Primary Examiner* — Raymond Alejandro
(74) *Attorney, Agent, or Firm* — Lee IP Law, P.C.

(57) ABSTRACT

A cobalt oxide for a lithium secondary battery, a method of preparing the cobalt oxide; a lithium cobalt oxide for a lithium secondary battery formed from the cobalt oxide; and a lithium secondary battery having a positive electrode including the lithium cobalt oxide, the cobalt oxide having a tap density of about 2.8 g/cc to about 3.0 g/cc, and an intensity ratio of about 0.8 to about 1.2 of a second peak at $2\theta$ of about $31.3\pm1°$ to a first peak at $2\theta$ of about $19\pm1°$ in X-ray diffraction spectra, as analyzed by X-ray diffraction.

5 Claims, 8 Drawing Sheets (51) Int. Cl.
- *H01M 10/052* (2010.01)
- *H01M 4/04* (2006.01)
- *H01M 10/0525* (2010.01)
- *H01M 4/52* (2010.01)
- *H01M 4/02* (2006.01)

(52) U.S. Cl.
CPC ..... *H01M 10/052* (2013.01); *H01M 10/0525* (2013.01); *H01M 2004/028* (2013.01)

(56) References Cited

U.S. PATENT DOCUMENTS

| | | | |
|---|---|---|---|
| 2013/0071661 A1* | 3/2013 | Chen | C01G 51/42 |
| | | | 428/402 |
| 2014/0124701 A1 | 5/2014 | Vanhatalo et al. | |

FOREIGN PATENT DOCUMENTS

| | | | |
|---|---|---|---|
| CN | 101274782 A | 10/2008 | |
| CN | 103303982 A | 9/2013 | |
| KR | 10-1999-0054998 A | 7/1999 | |
| KR | 10-2010-0032369 A | 3/2010 | |
| KR | 10-2014-0020821 A | 2/2014 | |

OTHER PUBLICATIONS

Office Action issued by the Chinese Patent Office dated Sep. 6, 2019 in the examination of the Chinese Patent Application No. 201710821892.5.

* cited by examiner

COBALT OXIDE FOR LITHIUM SECONDARY BATTERY, PREPARING METHOD THEREOF, LITHIUM COBALT OXIDE FORMED FROM THE COBALT OXIDE, AND LITHIUM SECONDARY BATTERY HAVING POSITIVE ELECTRODE INCLUDING THE LITHIUM COBALT OXIDE

CROSS-REFERENCE TO RELATED APPLICATION

Korean Patent Application No. 10-2016-0118208, filed on Sep. 13, 2016, and Korean Patent Application No. 10-2017-0115909, filed on Sep. 11, 2017, in the Korean Intellectual Property Office, and entitled: "Cobalt Oxide for Lithium Secondary Battery, Preparing Method Thereof, Lithium Cobalt Oxide Formed From the Cobalt Oxide, and Lithium Secondary Battery Having Positive Electrode Comprising the Lithium Cobalt Oxide," is incorporated by reference herein in its entirety.

BACKGROUND

1. Field

Embodiments relate to a cobalt oxide for a lithium secondary battery, a method of preparing the same, a lithium cobalt oxide formed from the cobalt oxide, and a lithium secondary battery having a positive electrode including the lithium cobalt oxide.

2. Description of the Related Art

High-voltage lithium secondary batteries with high energy density may be used in a variety of applications. For example, in the field of electric vehicles (including hybrid electric vehicles (HEVs) and plug-in hybrid electric vehicles (PHEVs)), a lithium secondary battery operable at a high temperature with good discharge capacity to charge and discharge a large quantity of electricity may be used.

SUMMARY

The embodiments may be realized by providing a cobalt oxide for a lithium secondary battery, the cobalt oxide having a tap density of about 2.8 g/cc to about 3.0 g/cc, and an intensity ratio of about 0.8 to about 1.2 of a second peak at 2θ of about 31.3±1° to a first peak at 2θ of about 19±1° in X-ray diffraction spectra, as analyzed by X-ray diffraction.

The cobalt oxide may have an average particle diameter (D50) of about 15 μm to about 18 μm, a particle diameter (D90) of about 23 μm to about 25 μm, and a particle diameter (D10) of about 5 μm to about 7 μm.

The cobalt oxide may have a tap density of about 2.8 g/cc to about 3.0 g/cc.

The embodiments may be realized by providing a method of preparing the cobalt oxide for a lithium secondary battery according to an embodiment, the method including performing a precipitation reaction of a mixture including a cobalt precursor and a precipitant, and the precipitation reaction is carried out under an oxidizing gas atmosphere to obtain the cobalt oxide.

The method may further include washing and sieving a reaction product after the reacting under the oxidizing gas atmosphere.

The precipitation reaction of the mixture may be performed at a pH of about 11.0 to about 12.0 and a temperature of about 60° C. to about 80° C.

The cobalt precursor may be cobalt sulfate.

The embodiments may be realized by providing a lithium cobalt oxide for a lithium secondary battery, the lithium cobalt oxide being represented by Formula 1 and having a spherical particle shape, a pellet density of about 3.98 g/cc to about 4.2 g/cc, an average particle diameter (D50) of about 23 μm to about 28 μm, a particle diameter (D90) of about 35 μm to about 45 μm, and a particle diameter (D10) of about 10 μm to about 13 μm:

$$Li_aCo_bO_c$$ [Formula 1]

wherein, in Formula 1, 0.9≤a≤1.1, 0.98≤b≤1.00, and 1.9≤c≤2.1.

The lithium cobalt oxide may further include at least one selected from magnesium (Mg), calcium (Ca), strontium (Sr), titanium (Ti), zirconium (Zr), boron (B), aluminum (Al), and fluorine (F).

The embodiments may be realized by providing a lithium secondary battery comprising a positive electrode that includes the lithium cobalt oxide according to an embodiment.

The positive electrode may have a density of about 4.05 g/cc to about 4.15 g/cc.

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" includes any and all combinations of one or more of the associated listed items. Expressions such as "at least one of," when preceding a list of elements, modify the entire list of elements and do not modify the individual elements of the list.

Hereinafter, example embodiments of a cobalt oxide for a lithium secondary battery, a method of preparing the cobalt oxide, a lithium cobalt oxide formed from the cobalt oxide, and a lithium secondary battery having a positive electrode including the lithium cobalt oxide will be described in greater detail.

According to an aspect of the present disclosure, there is provided a cobalt oxide ($Co_3O_4$) for a lithium secondary battery. The cobalt oxide may have, e.g., a tap density of about 2.8 g/cc to about 3.0 g/cc, and an intensity ratio of about 0.8 to about 1.2 of a second peak at 2θ of about 31.3±1° to a first peak at 2θ of about 19±1° in X-ray diffraction spectra, as analyzed by X-ray diffraction.

The first peak and the second peak may correspond to the (111) crystal plane and (220) crystal plane of the cobalt oxide, respectively.

For example, the intensity ratio of the second peak to the first peak may be 1.0.

A cobalt oxide as a precursor of lithium cobalt oxide may be small particles having an average particle diameter of about 5 μm to about 7 μm. When such a cobalt oxide is used to form a lithium cobalt oxide having a large particle diameter, a lithium precursor such as lithium carbonate, lithium hydroxide, or the like may be used in an excess of about 1.04 to 1.05 mole with respect to 1 mole of the cobalt oxide. When such an excess of a lithium precursor is used, a process of removing excess lithium may be performed, causing preparation cost increase of the lithium cobalt oxide.

Figure 1A:
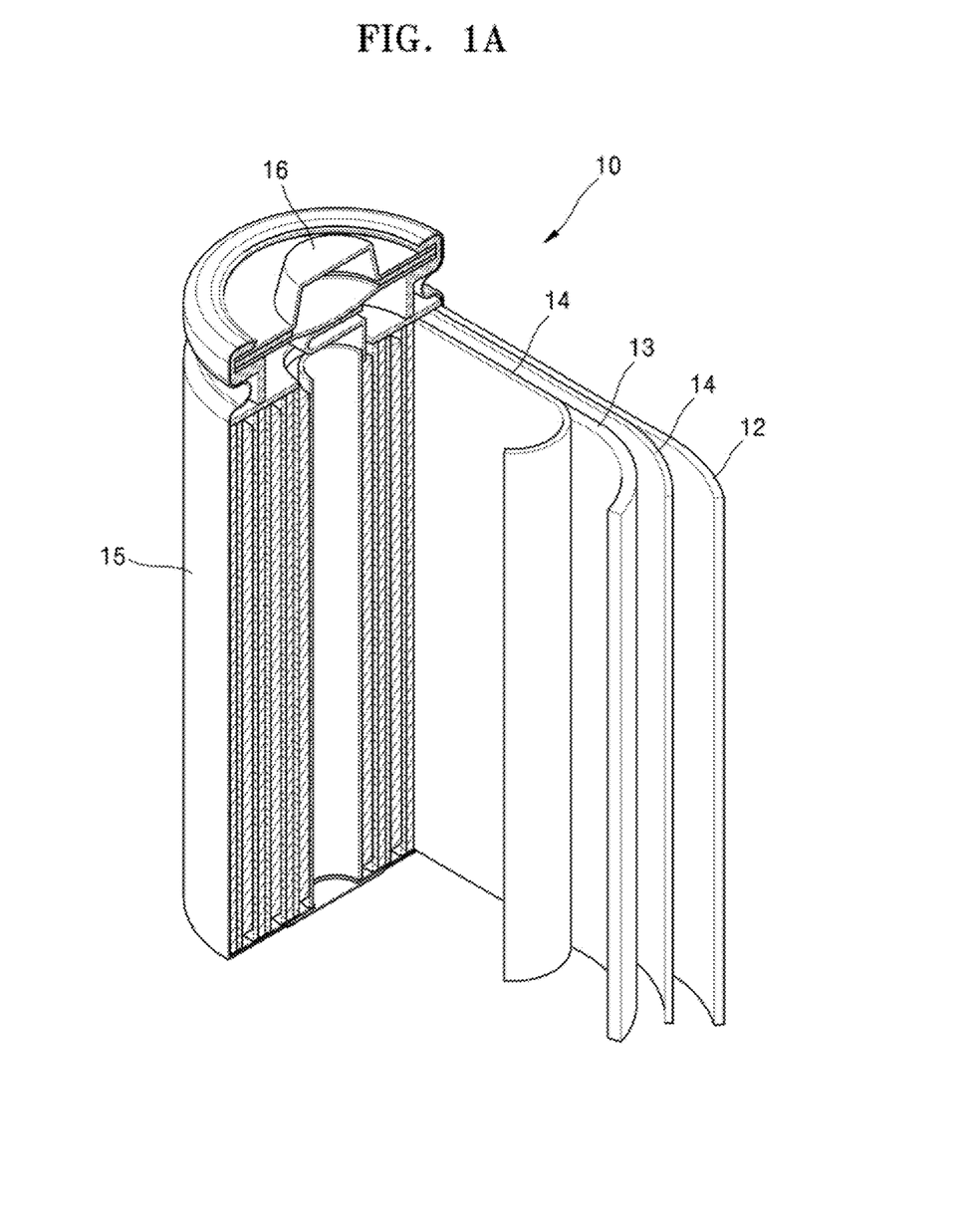
FIG. 1A illustrates a schematic view of a lithium secondary battery according to an embodiment.
Figure 1B:
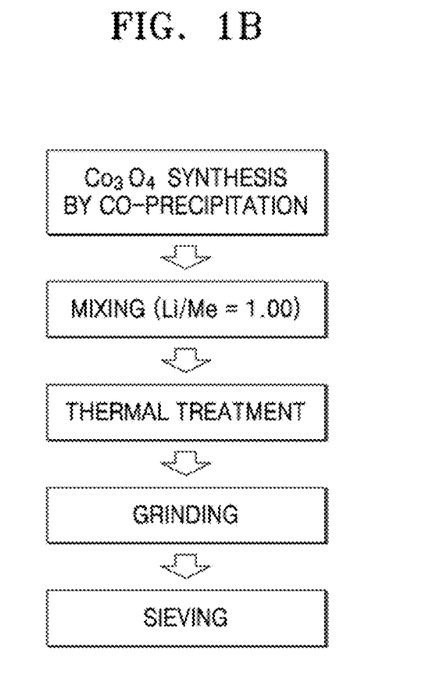
FIG. 1B illustrates a flowchart of a method of preparing a lithium cobalt oxide according to an embodiment.
Figure 1C:
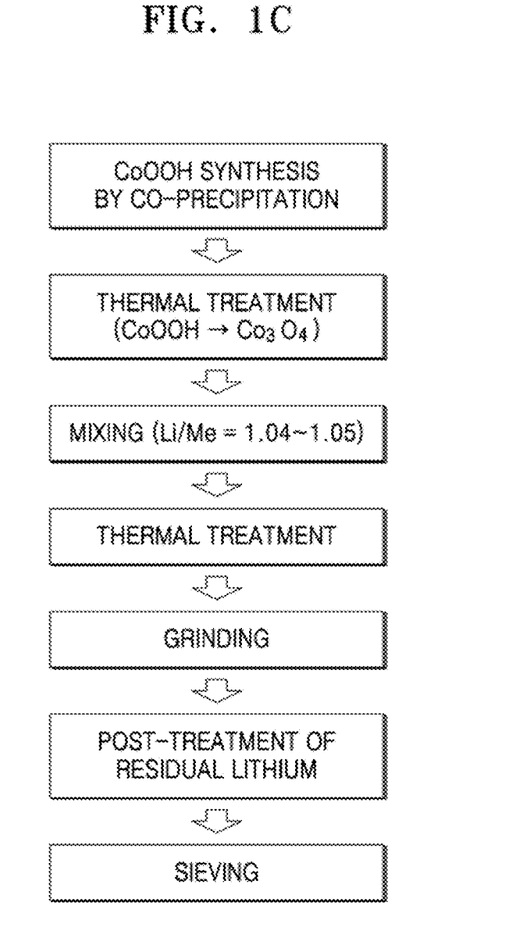
FIG. 1C illustrates a flowchart of a comparative method of preparing a lithium cobalt oxide.

A lithium cobalt oxide may be obtained according to a comparative preparation method illustrated in FIG. 1C. First, a cobalt oxide ($Co_3O_4$) may be prepared by thermally treating CoOOH obtained by co-precipitation reaction. A lithium precursor may be added to the prepared cobalt oxide and thermally treated to obtain a lithium cobalt oxide, which may then be ground, followed by a post-treatment process to remove residual lithium and a sieving process.

Referring to FIG. 1B, a method of preparing a lithium cobalt oxide according to an embodiment may include preparing a cobalt oxide ($Co_3O_4$) through a precipitation reaction of a cobalt precursor, and oxygen is injected to accelerate oxidation during the precipitation reaction. Lithium cobalt oxide is prepared by adding a lithium precursor to the prepared cobalt oxide and heat-treating the resultant.

A cobalt oxide ($Co_3O_4$) according to an embodiment may be prepared by oxidation precipitation, without need to perform thermal treatment, unlike cobalt oxide prepared using a thermal treatment as described above with reference to FIG. 1C, thus reducing preparation cost. No thermal treatment may be performed, and a pore-free, high-density cobalt oxide may be obtained. Using this high-density cobalt oxide, an electrode with improved electrode density may be prepared.

Next, the cobalt oxide may be mixed with a lithium precursor and then thermally treated to obtain a target lithium cobalt oxide of Formula 1. The amounts of the cobalt oxide and the lithium precursor may be stoichiometrically adjusted to obtain the target lithium cobalt oxide of Formula 1. Just a stoichiometric, non-excess amount of the lithium precursor, required to form the target compound, may be added. For example, when the target lithium cobalt oxide of Formula 1 is $LiCoO_2$, the cobalt oxide and a lithium precursor may be used, e.g., in a molar ratio of about 1:1. The lithium cobalt oxide prepared may be subjected to grinding and sieving processes.

In an implementation, the cobalt oxide may have an average particle diameter (D50) of about 15 μm to about 18 μm, e.g., about 15 μm to about 17 μm. The cobalt oxide according to an embodiment may have a relatively large average particle diameter within these ranges, and a lithium cobalt oxide having a large particle diameter may be easily prepared from the cobalt oxide, without addition of an excess of a lithium precursor as used to prepare other lithium cobalt oxides. In an implementation, the cobalt oxide may have, e.g., a particle diameter (D90) of about 23 μm to about 25 μm and a particle diameter (D10) of about 5 μm to about 7 μm.

An intensity ratio of a second peak at 2θ of 31.3±1° to a first peak at 2θ of 19±1° in X-ray diffraction spectra gives information about a ratio of $Co^{3+}$ and $Co^{2+}$ in the cobalt oxide ($Co_3O_4$). In an implementation, an atomic ratio of $Co^{2+}$(tet) to $Co^{3+}$(oct) in the cobalt oxide ($Co_3O_4$) may be about 1:2.1 to about 1:2.25.

In an implementation, a lithium cobalt oxide formed from the cobalt oxide may have a pellet density of about 3.98 g/cc to about 4.2 g/cc. The cobalt oxide may have a high tap density, e.g., of about 2.8 g/cc to about 3.0 g/cc. When the cobalt oxide has a pellet density and a tap density within these ranges, an electrode having good density characteristics may be prepared.

A positive electrode formed using a lithium cobalt oxide according to an embodiment may have a desirable density, e.g., of about 4.05 g/cc to about 4.15 g/cc. Using this positive electrode with the above-described electrode density, a lithium secondary battery with improved lifetime characteristics and rate characteristics may be manufactured. If the density of an electrode plate is only increased by, e.g., excessive pressing without increasing the tap density of a cobalt oxide and the pellet density of a lithium cobalt oxide prepared therefrom, impregnation of electrolyte may not be sufficient and/or the electrode plate may be broken, thus leading to deterioration in lifetime and electrochemical characteristics of a lithium secondary battery. A cobalt oxide according to any of the above-described embodiments may have an improved (e.g., higher) tap density, and a lithium cobalt oxide according to any of the above-described embodiments may have an improved (e.g., higher) pellet density, and thus may help prevent the above-described drawbacks when subjected to pressing. The lithium cobalt oxide may also have improved electrochemical characteristics.

A lithium cobalt oxide according to any of the embodiments may be prepared using an appropriate, non-excess amount of a lithium precursor, and a residual lithium (that could otherwise result from use of excess lithium precursor) may be less present in the lithium cobalt oxide. The amount of the residual lithium in a lithium cobalt oxide according to any of the embodiment may be, e.g., 500 ppm or less, as measured by titration.

In an implementation, the lithium cobalt oxide may have, e.g., an average particle diameter (D50) of about 23 μm to about 28 µm, a particle diameter (D90) of about 35 µm to about 45 µm, and a particle diameter (D10) of about 10 µm to about 13 µm.

As used herein, the terms "D50", "D90", and "D10" may refer to particle diameters corresponds 50%, 90%, and 10% by volume, respectively, of a cumulative distribution curve of particles accumulated from smallest to largest in particle size (diameter) with respect to a 100% total volume of the accumulated particles.

In an implementation, a lithium cobalt oxide may be a compound having a spherical particle shape represented by Formula 1, a pellet density of about 3.98 g/cc to about 4.2 g/cc, an average particle diameter (D50) of about 23 µm to about 28 µm, a particle diameter (D90) of about 35 µm to about 45 µm, and a particle diameter (D10) of about 10 µm to about 12 µm.

$$Li_aCo_bO_c \qquad \text{[Formula 1]}$$

In Formula 1, 0.9≤a≤1.1, 0.98≤b≤1.00, and 1.9≤c≤2.1.

In an implementation, the lithium cobalt oxide may have a high pellet density, a spherical particle shape with improved sphericity, and thus reduced specific surface area. Using such a lithium cobalt oxide according to an embodiment, a positive electrode with improved chemical stability under high-temperature charge and discharge conditions may be manufactured. A lithium secondary battery with improved capacity and rate characteristics may also be manufactured using the positive electrode.

If the pellet density of the lithium cobalt oxide were to be outside of the above range, a lithium secondary battery having a positive electrode including the lithium cobalt oxide could have reduced rate and capacity characteristics.

In an implementation, the lithium cobalt oxide represented by Formula 1 may be $LiCoO_2$.

In an implementation, the lithium cobalt oxide may further include at least one element selected from, e.g., magnesium (Mg), calcium (Ca), strontium (Sr), titanium (Ti), zirconium (Zr), boron (B), aluminum (Al), and fluorine (F). Using a positive electrode manufactured with a lithium cobalt oxide further including at least one of these elements, a lithium secondary battery with further improved electrochemical characteristics may be manufactured.

Hereinafter, embodiments of a method of preparing a cobalt oxide for a lithium secondary battery will be described in greater detail.

A precipitation reaction of a mixture including a cobalt precursor. e.g., a cobalt sulfate, a precipitant, and a solvent is carried out, and an oxygen is injected to accelerate oxidation during the precipitation reaction. As such, the precipitation reaction is carried out under an oxidizing gas atmosphere.

A chelating agent may optionally be further added into the mixture during the precipitation reaction. The chelating agent may be any chelating agent commonly used in the art. For example, the chelating agent may include ammonia, ammonium sulfate, or the like.

The precipitation reaction may be performed at a temperature of about 60° C. to about 80° C. When the precipitation reaction is performed within this temperature range, a cobalt oxide with improved density characteristics may be obtained.

The pH of the mixture may be adjusted within a range of about pH 11 to pH 12. When the mixture has a pH within this range, a cobalt oxide satisfying target particle conditions may be obtained.

The precipitant as a pH adjusting agent of the mixture may include, e.g., a sodium hydroxide solution, sodium carbonate solution, ammonium bicarbonate ($NH_4HCO_3$) solution, or the like.

The solvent may include, e.g., water. The amount of the solvent may be from about 100 parts to about 3,000 parts by weight, based on 100 parts by weight of the cobalt precursor. When the amount of the solvent is within this range, a uniform mixture of the ingredients may be obtained.

The cobalt oxide according to an embodiment obtained through the above-described processes may have improved pellet density, compared to a cobalt oxide prepared by a conventional method. Using the cobalt oxide according to an embodiment, a high-density lithium cobalt oxide having a large particle diameter may be obtained. Using this lithium cobalt oxide, a positive electrode with improved electrode density may be manufactured.

A method of preparing a lithium cobalt oxide from the cobalt oxide prepared according to the above-described process will be described as follows.

After the cobalt oxide may be mixed with a lithium precursor to obtain a mixture, the mixture may be thermally treated.

The lithium precursor may include, e.g., lithium hydroxide, lithium fluoride, lithium carbonate, or a mixture thereof. The amount of the lithium precursor may be stoichiometrically controlled to obtain a lithium cobalt oxide of Formula 1. For example, when a target lithium cobalt oxide, i.e., the lithium cobalt oxide of Formula 1, is $LiCoO_2$, the amount of the lithium precursor may be about 1.0 mole with respect to 1 mole of the cobalt oxide.

The thermal treatment may be performed at a temperature of about 1,000° C. to about 1,200° C. When the thermal treatment temperature is within this range, a lithium cobalt oxide with improved pellet density may be obtained.

The resulting product from the thermal treatment may be ground and then sieved to obtain a lithium cobalt oxide having a target average particle diameter and a target pellet density.

In an implementation, the lithium cobalt oxide may have, e.g., an average particle diameter (D50) of about 23 µm to about 28 µm, a particle diameter (D90) of about 35 µm to about 45 µm, and a particle diameter (D10) of about 10 µm to about 12 µm.

Hereinafter, a method of preparing a lithium secondary battery using a lithium cobalt oxide according to any of the above-described embodiments as a positive active material will be described in detail. For example, a method of manufacturing a lithium secondary battery including a positive electrode, a negative electrode, a lithium salt-containing non-aqueous electrolyte, and a separator will be described as an embodiment.

The positive electrode and the negative electrode may be formed by coating a positive active material layer composition and a negative active material layer composition, respectively, on current collectors, and then drying the resulting products.

The positive active material layer composition may be prepared by mixing a positive active material, a conducting agent, a binder, and a solvent, wherein the lithium cobalt oxide according to any of the above-described embodiments may be used as the positive active material. The amount of the positive active material may be in a range of about 1 part to about 50 parts by weight, based on 100 parts by weight of the positive active material layer composition.

The binder may facilitate binding of an active material to a conducting agent and/or to a current collector. Examples of the binder may include polyvinylidene fluoride, polyvinyl alcohol, carboxymethylcellulose (CMC), starch, hydroxypropylcellulose, reproduced cellulose, polyvinyl pyrrolidone, polytetrafluoroethylene, polyethylene, polypropylene, ethylene-propylene-diene terpolymer (EPDM), sulfonated EPDM, styrene-butadiene rubber, fluororubber, and various copolymers. The amount of the binder may be in a range of about 2 parts to about 5 parts by weight, based on 100 parts by weight of the positive active material layer composition. When the amount of the binder is within this range, a binding force of the positive active material layer to the current collector may be satisfactorily strong.

The conducting agent may include a suitable material that has an appropriate conductivity without causing chemical changes in the fabricated battery. Examples of the conducting agent may include graphite such as natural graphite or artificial graphite; carbonaceous materials such as carbon black, acetylene black, Ketjen black, channel black, furnace black, lamp black, or summer black; conductive fibers such as carbon fibers or metal fibers; metallic powder such as aluminum powder, or nickel powder; fluorinated carbon powder; conductive whiskers such as zinc oxide or potassium titanate; conductive metal oxides such as a titanium oxide; and a conductive material such as polyphenylene derivatives.

The amount of the conducting agent may be in a range of about 2 parts to about 5 parts by weight, based on 100 parts by weight of the positive active material layer composition. When the amount of the conducting agent is within this range above, a finally obtained positive electrode may have improved conductivity characteristics An example of the solvent may include N-methylpyrrolidone.

The amount of the solvent may be in a range of about 10 part to about 200 parts by weight, based on 100 parts by weight of the positive active material. When the amount of the solvent is within this range, forming the positive active material layer may be facilitated.

The positive current collector may have a suitable thickness, e.g., in a range of about 3 μm to about 500 μm, so long as a material forming the positive current collector has high conductivity without causing a chemical change in a battery. For example, the positive current collector may be formed of stainless steel, aluminum, nickel, titanium, heat-treated carbon, or aluminum, or stainless steel that is surface-treated with carbon, nickel, titanium, silver, or the like. The positive current collector may have an uneven surface with fine irregularities to improve a binding force with the positive active material, and may have any of various forms, including a film, a sheet, a foil, a net, a porous body, a foam, and a non-woven fabric.

The negative active material layer composition may be prepared by mixing a negative active material, a binder, a conducting agent, and a solvent together.

The negative active material may be a material that allows intercalation and deintercalation of lithium ions. Examples of the negative active material may include a carbonaceous material such as graphite and carbon; lithium metal and an alloy thereof; and a silicon oxide-based material. In an implementation, the negative active material may include silicon oxide.

The amount of the binder may be in a range of about 1 part to about 50 parts by weight, based on 100 parts by weight of the negative active material layer composition. Examples of the binder may be the same as those listed above in connection with the preparation of the positive electrode.

The amount of the conducting agent may be in a range of about 1 part to about 5 parts by weight, based on 100 parts by weight of the negative active material layer composition. When the amount of the conducting agent is within this above range, a finally obtained negative electrode may have improved conductivity characteristics.

The amount of the solvent may be in a range of about 10 part to about 200 parts by weight, based on 100 parts by weight of the negative active material. When the amount of the solvent is within this range, forming the negative active material layer may be facilitated.

Examples of the conducting agent and the solvent used herein may be the same as those listed above in connection with the preparation of the positive electrode.

A negative current collector may have a suitable thickness, e.g., in a range of about 3 μm to about 500 μm, so long as a material forming the negative current collector has conductivity without causing a chemical change in a battery. For example, the negative current collector may be formed of copper, stainless steel, aluminum, nickel, titanium, heat-treated carbon, or copper, or stainless steel that is surface-treated with carbon, nickel, titanium, silver, or the like. In addition, similar to the positive current collector, the negative current collector may have an uneven surface with fine irregularities to improve a binding force with the negative active material, and may have any of various forms, including a film, a sheet, a foil, a net, a porous body, a foam, and a non-woven fabric.

Then, a separator may be disposed between the positive electrode and the negative electrode fabricated according to the above-described processes.

The separator may have a pore diameter in a range of about 0.01 μm to about 10 μm and a thickness in a range of about 5 μm to about 300 μm. Examples of the separator may include an olefin-based polymers such as polypropylene or polyethylene; or sheets or non-woven fabric formed of glass fiber. When a solid electrolyte, e.g., a polymer electrolyte is used, the solid electrolyte may also serve as the separator.

The lithium salt-containing non-aqueous electrolyte may include a non-aqueous electrolyte and a lithium salt. The non-aqueous electrolyte may be, e.g., a non-aqueous liquid electrolyte, an organic solid electrolyte, or an inorganic solid electrolyte.

In an implementation, the non-aqueous liquid electrolyte may include, e.g., an aprotic organic solvent, for example, N-methyl-2-pyrrolidone, propylene carbonate, ethylene carbonate, butylene carbonate, dimethyl carbonate, diethyl carbonate, gamma-butyrolactone, 1,2-dimethoxyethane, 2-methyl tetrahydrofuran, dimethylsulfoxide, 1,3-dioxolane, formamide, N,N-dimethylformamide, acetonitrile, nitromethane, methyl formate, methyl acetate, trimethoxy methane, a dioxolane derivative, sulfolane, methylsulfolane, 1,3-dimethyl-2-imidazolidinone, a propylene carbonate derivative, a tetrahydrofuran derivative, ether, methyl propionate, or ethyl propionate.

Examples of the organic solid electrolyte may include a polyethylene derivative, a polyethylene oxide derivative, a polypropylene oxide derivative, a phosphoric acid ester polymer, polyvinyl alcohol, and polyfluoride vinylidene.

Examples of the inorganic solid electrolyte may include $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

In an implementation lithium salt as a material dissoluble in a non-aqueous electrolyte may include, e.g., $LiCl$, $LiBr$, $LiI$, $CiClO_4$, $LiBF_4$, $LiB_{10}Cl_{10}$, $LiPF_6$, $LiCF_3SO_3$, LiCF$_3$CO$_2$, LiAsF$_6$, LiSbF$_6$, LiAlCl$_4$, CH$_3$SO$_3$Li, (CF$_3$SO$_2$)$_2$NLi, (FSO$_2$)$_2$NLi, lithium chloroborate, or lower aliphatic lithium carboxylate.

FIG. 1 illustrates a schematic cross-sectional view of a structure of a lithium secondary battery 10 according to an embodiment.

Referring to FIG. 1, the lithium secondary battery 10 according to an embodiment may include a positive electrode 13; a negative electrode 12; a separator 14 between the positive electrode 13 and the negative electrode 12; an electrolyte impregnated into the positive electrode 13, the negative electrode 12, and the separator 14; a battery case 15; and a cap assembly 16 sealing the battery case 15. In an implementation, the lithium secondary battery 10 may be manufactured by sequentially stacking the positive electrode 13, the separator 14, the negative electrode 12 in this stated order to form a stack, winding this stack into a spiral form, and encasing the wound stack into the battery case 15. The battery case 15 may then be sealed with the cap assembly 16, thereby completing manufacturing of the lithium secondary battery 10.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1: Preparation of Cobalt Oxide and Lithium Cobalt Oxide

An about 1.5 M cobalt sulfate aqueous solution, and a 3.0 M NaOH aqueous solution as a precipitant were prepared and then put at the same time into a reactor to obtain a reaction mixture. After a pH adjustment of the reaction mixture to about pH 11.5, a precipitation reaction was carried out at about 70° C. In order to facilitate oxidation during the precipitation reaction, oxygen was fed into the mixture of the precipitation reaction in a continuous flow stirred-tank reactor (CSTR). The CSTR does not refer to the reactor itself, but rather to the continuous stirred reaction type.

As a result of these processes, spherical Co$_3$O$_4$ having an average particle diameter (D50) of about 15 µm was obtained. This spherical Co$_3$O$_4$ was washed repeatedly with deionized water using a centrifuge until the amount of SO$_4$ reached about 100 ppm or less, followed by sieving through a sieve having an about 270 mesh size to obtain a high-density cobalt oxide (Co$_3$O$_4$).

The obtained cobalt oxide and lithium carbonate were dry-mixed in a molar ratio of Co:Li of about 1:1 with a mixer for about 5 minutes, and then thermally treated at about 1,100° C. for about 10 hours to obtain a lithium cobalt oxide (LiCoO$_2$). After the thermal treatment, the resulting lithium cobalt oxide was ground by jet milling at about 2,000 rpm and then sieved through a sieve having an about 325 mesh size.

Example 2

Cobalt oxide (Co$_3$O$_4$) and lithium cobalt oxide (LiCoO$_7$) were obtained in the same manner as in Example 1, except that the temperature of the precipitation reaction for preparing the cobalt oxide was changed to about 80° C.

Comparative Example 1

An about 1.5 M cobalt sulfate aqueous solution, a 3.0 M NH$_4$HCO$_3$ aqueous solution as a precipitant, and a NH$_4$OH aqueous solution as a chelating agent were prepared and then put at the same time into a reactor to obtain a reaction mixture. After a pH adjustment of the reaction mixture to about pH 11.5, a precipitation reaction was carried out at about 40° C. to obtain CoOOH as a precipitate.

The obtained precipitate was filtered, washed, and dried overnight at about 120° C. to obtain cobalt oxide (Co$_3$O$_4$).

The cobalt oxide was thermally treated at about 800° C. (first thermal treatment) to obtain a cobalt oxide (Co$_3$O$_4$). The obtained cobalt oxide had an average particle diameter of about 5.4 µm.

The obtained cobalt oxide and lithium carbonate were dry-mixed in a molar ratio of Co:Li of about 1:1.04 with a mixer for about 5 minutes, and then thermally treated at about 1,100° C. for about 10 hours (second thermal treatment). After the second thermal treatment, the resulting product was ground by jet milling at about 2,000 rpm, followed by a post-treatment to remove residual lithium and then sieving, thereby obtaining a lithium cobalt oxide (LiCoO$_2$).

Manufacture Example 1

A coin cell was manufactured using the lithium cobalt oxide (LiCoO$_2$) prepared in Example 1.

96 g of the lithium cobalt oxide (LiCoO$_2$) prepared in Example 1, 2 g of polyvinylidene fluoride, 47 g of N-methylpyrrolidone as a solvent, and 2 g of carbon black as a conducting agent were mixed with a mixer to prepare a uniformly dispersed slurry for forming a positive active material layer.

The prepared slurry was coated on an aluminum foil using a doctor blade to form a thin electrode plate. The electrode plate was then dried at about 135° C. for about 3 hours, followed by roll pressing and vacuum drying, thereby manufacturing a positive electrode.

A 2032-type coin cell was manufactured using the positive electrode and a lithium metal counter electrode. While a porous polyethylene (PE) film separator (having a thickness of about 16 µm) was disposed between the positive electrode and the lithium metal counter electrode, an electrolyte was injected thereinto, thereby obtaining the 2032-type coin cell.

The electrolyte was a 1.1 M LiPF$_6$ solution in a mixed solvent of ethylene carbonate (EC) and ethyl methyl carbonate (EMC) in a volume ratio of about 3:5.

Manufacture Example 2

A coin cell was manufactured in the same manner as in Manufacture Example 1, except that the lithium cobalt oxide (LiCoO$_2$) prepared in Example 2 was used instead of the lithium cobalt oxide (LiCoO$_2$) prepared in Example 1.

Comparative Manufacture Example 1

A coin cell was manufactured in the same manner as in Manufacture Example 1, except that the lithium cobalt oxide (LiCoO$_2$) prepared in Comparative Example 1 was used instead of the lithium cobalt oxide (LiCoO$_2$) prepared in Example 1.

Evaluation Example 1: X-Ray Diffraction (XRD) Analysis

The cobalt oxides (Co$_3$O$_4$) prepared in Example 1 and Comparative Example 1 were analyzed by X-ray diffraction (XRD). The analysis results are shown in FIGS. 2A and 2B.

Figure 2A:
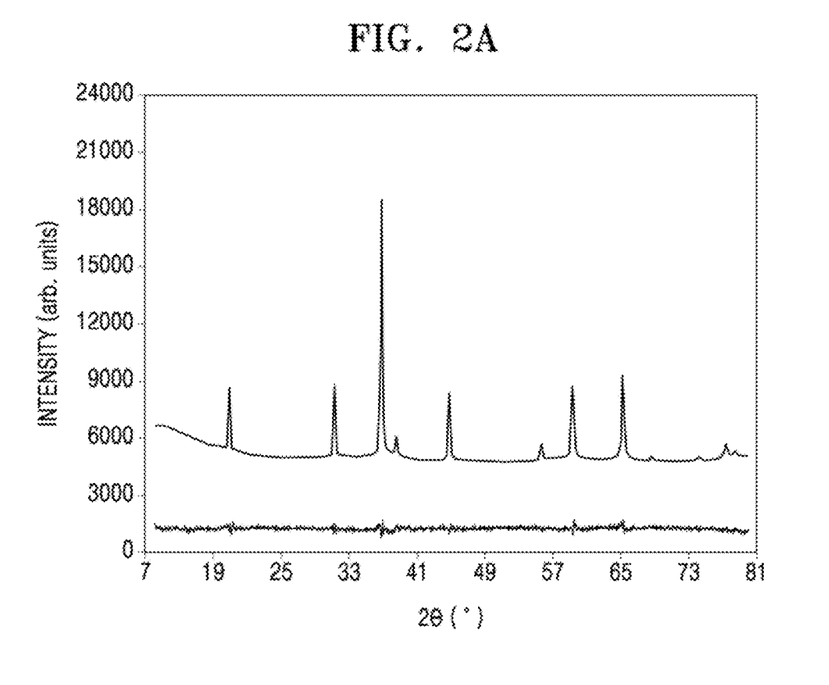
FIGS. 2A and 2B illustrate graphs showing results of X-ray diffraction analysis on cobalt oxides ($Co_3O_4$) prepared in Example 1 and Comparative Example 1, respectively.
Figure 2B:
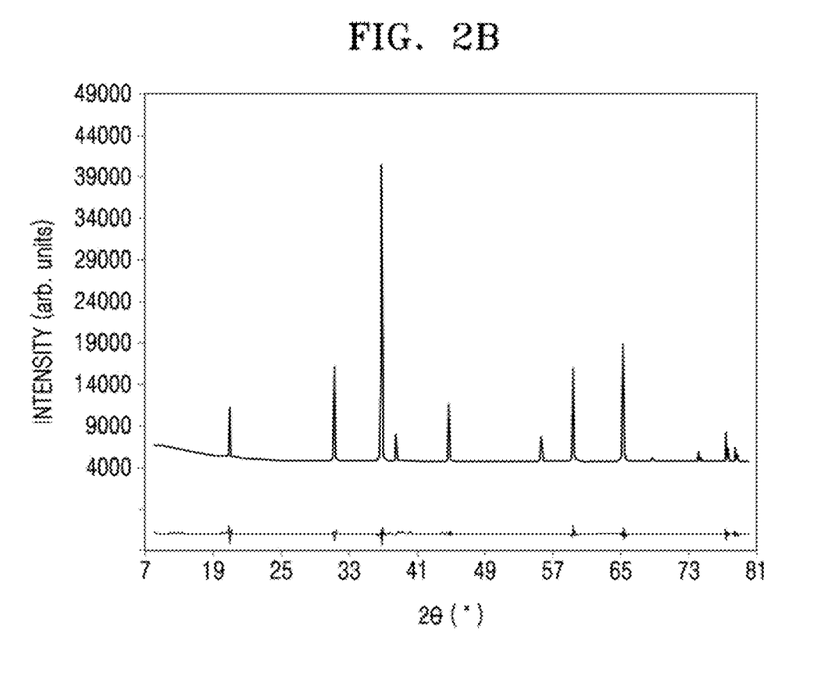

Referring to FIG. 2A, the cobalt oxide of Example 1 was found to have an about 1:1 intensity ratio of a second peak at 2θ of about 31.3° to a first peak at 2θ of about 19° in its X-ray diffraction spectra. Meanwhile, as shown in FIG. 2B, the cobalt oxide of Comparative Example 1 had an about 1:2 intensity ratio of a first peak at 2θ of about 19° to a second peak at 2θ of about 31.3° in its X-ray diffraction spectra. These results indicate that the cobalt oxide of Example 1 had a different intensity ratio of the second peak to the first peak from that of the cobalt oxide of Comparative Example 1. Parameters analyzed by X-ray diffraction are shown in Table 1.

TABLE 1

| Sample | a (Å) | x(O) = y(O) = z(O) | Co$^{2+}$ (tet) | Co$^{3+}$ (oct) | R$_B$ |
|---|---|---|---|---|---|
| Example 1 | 8.0821 | 0.2617 | 0.480 | 1.072 | 8.8 |
| Comparative Example 1 | 8.0811 | 0.2613 | 0.510 | 1.023 | 7.8 |

In Table 1, R$_B$ indicates a fitting accuracy of XRD patterns, "a" denotes the a-axis inside the structure, x(O)=y(O)=z(O) indicates an oxygen coordinate value in the structure, and "oct" is an abbreviation for octahedral, and "tet" for tetrahedral.

Referring to Table 1, the cobalt oxide of Example 1 was found to include more Co$^{3+}$(oct) than Co$^{2+}$(tet) and have an atomic ratio of about 1:2.23 of Co$^{2+}$(tet) to Co$^{3+}$(oct), while the cobalt oxide of Comparative Example 1 had an atomic ratio of about 1:2 of Co$^{2+}$(tet) to Co$^{3+}$(oct).

Evaluation Example 2: Pellet Density and Electrode Density

The pellet densities of the lithium cobalt oxide prepared in Example 1 and the lithium cobalt oxide prepared in Comparative Example 1 were analyzed using a pellet density tester. The results are shown in Table 2. The pellet density was determined by measuring the density of the cathode active material having a pellet shape obtained by applying 3 g of the cathode active material into a circular mold having a diameter of 1.273 cm and applying a pressure of 1500 kgf/cm$^2$ to the mass per volume of the cathode active material.

TABLE 2

| Example | Pellet density (g/cc) |
|---|---|
| Example 1 | 3.98 |
| Comparative Example 1 | 3.87 |

Referring to Table 2, the lithium cobalt oxide prepared in Example 1 had an increased pellet density, compared to the lithium cobalt oxide prepared in Comparative Example 1.

Densities of the positive electrodes manufactured in Manufacture Example 1 and Comparative Manufacture Example 1 were measured. The results are shown in Table 3 and FIG. 3. The density of the negative electrode is calculated by dividing the weight of the anode by the negative electrode volume.

TABLE 3

| Example | Positive electrode density (g/cc) |
|---|---|
| Manufacture Example 1 | 4.09 |
| Comparative Manufacture Example 1 | 4.00 |

Figure 3:
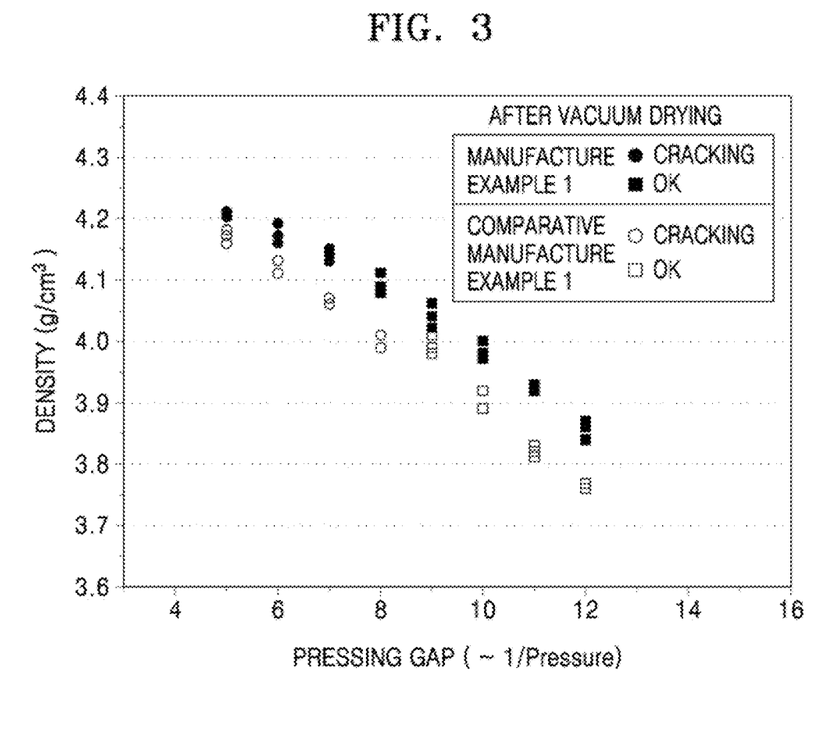
FIG. 3 illustrates a graph showing density with respect to pressing gap of positive electrodes manufactured in Manufacture Example 1 and Comparative Manufacture Example 1.
Figure 4:
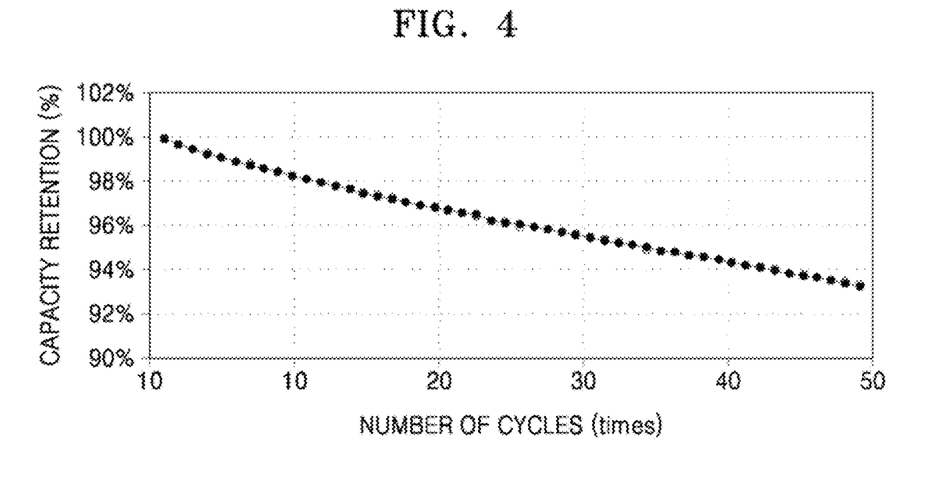
FIG. 4 illustrates a graph showing capacity retention with respect to the number of cycles in a lithium secondary battery manufactured in Manufacture Example 1.

Referring to Table 3 and FIG. 3, the positive electrode manufactured in Manufacture Example 1 had an improved density, compared to the positive electrode manufactured in Comparative Manufacture Example 1.

Evaluation Example 3: Charge-Discharge Test (Initial Charge and Discharge Efficiency and Capacity Retention)

Charge and discharge characteristics of the coin cells manufactured in Manufacture Example 1 and Comparative Manufacture Example 1 were evaluated using a charger/discharger under the following conditions: The coin cells of Manufacture Example 1 and Comparative Manufacture Example 1 were each charged at a constant current of 0.1 C rate at 25° C. until the voltage reached 4.5 V (vs. Li) and then, while maintaining a constant voltage of 4.5 V, the charging process was cut off at a current of 0.05 C rate. Subsequently, each coin cell was discharged with a constant current of 0.1 C rate until the voltage reached 3.0 V (vs. Li) (formation operation, 1$^{st}$ cycle).

Each coin cell after the 1$^{st}$ cycle of the formation operation was charged at a constant current of 0.2 C rate at 25° C. until the voltage reached 4.5 V (vs. Li) and then, while maintaining a constant voltage of 4.5 V, the charging process was cut off at a current of 0.05 C rate. Subsequently, each coin cell was discharged at a constant current of 0.2 C rate until the voltage reached 3.0 V (vs. Li) (formation operation, 2$^{nd}$ cycle).

Each coin cell after the 2$^{nd}$ cycle of the formation operation was charged at a constant current of 1.0 C rate at 25° C. until the voltage reached 4.5 V (vs. Li) and then, while maintaining a constant voltage of 4.5 V, the charging process was cut off at a current of 0.05 C rate. Subsequently, each coin cell was discharged at a constant current of 1.0 C rate until the voltage reached 3.0 V (vs. Li), and this cycle of charging and discharging was repeated 50 times.

The initial charge/discharge efficiency was calculated using Equation 1. The results are shown in Table 4.

Initial charge/discharge efficiency (ICE) [%]=[1$^{st}$ cycle discharge capacity/1$^{st}$ cycle charge capacity]×100    [Equation 1]

A capacity retention with respect to the number of cycles of the coin cell manufactured in Manufacture Example 1 is shown in FIG. 5.

TABLE 4

| Example | Charge capacity (mAh/g) | Discharge capacity (mAh/g) | I.C.E (%) |
|---|---|---|---|
| Manufacture Example 1 | 223 | 219 | 98 |

TABLE 4-continued

| Example | Charge capacity (mAh/g) | Discharge capacity (mAh/g) | I.C.E (%) |
|---|---|---|---|
| Comparative Manufacture Example 1 | 220 | 216 | 98 |

Referring to Table 4, the coin cell of Manufacture Example 1 was found to have nearly same initial efficiency characteristics as the coin cell of Comparative Manufacture Example 1.

Referring to FIG. 5, the coin cell of Manufacture Example 1 was found to have good capacity retention.

Evaluation Example 4: Rate Characteristics

Each of the coin cells manufactured in Manufacture Examples 1 and 2 and Comparative Manufacture Example 1 was constant-current charged at a rate of 0.1 C until the voltage reached 4.5 V and then, the coin cells were constant-current discharged at a rate of 0.1 C until the voltage reached 3.0 V.

During a $2^{nd}$ cycle, the coin cells were constant-current charged at a rate of 0.5 C until the voltage reached 4.5 V, and then, while the voltage maintained at 4.5 V, the coin cells were constant-voltage charged until the current reached 0.05 C and then, at a rate of 0.2 C, the coin cells were constant-current discharged until the voltage reached 3.0 V.

During a $3^{rd}$ cycle, the coin cells were constant-current charged at a rate of 0.5 C until the voltage reached 4.5 V, and then, while the voltage maintained at 4.5 V, the coin cells were constant-voltage charged until the current reached 0.05 C and then, at a rate of 1.0 C, the coin cells were constant-current discharged until the voltage reached 3.0 V.

During a $4^{th}$ cycle, the coin cells were constant-current charged at a rate of 0.5 C until the voltage reached 4.5 V, and then, while the voltage maintained at 4.5 V, the coin cells were constant-voltage charged until the current reached 0.05 C and then, at a rate of 2.0 C, the coin cells were constant-current discharged until the voltage reached 3.0 V.

The rate characteristics of the coin cells of Manufacture Example 1 and Comparative Manufacture Example 1 are shown in Table 5.

The rate characteristics of Table 5 were calculated using Equations 2 and 3.

Rate characteristics($1C/0.1C$)(%)=(discharging capacity in $3^{rd}$ cycle)/(discharging capacity in $1^{st}$ cycle)×100  [Equation 2]

Rate characteristics($2C/0.2C$)(%)=(discharging capacity in $4^{th}$ cycle)/(discharging capacity in $2^{nd}$ cycle)×100  [Equation 3]

TABLE 5

| Example | Rate characteristics (1 C/0.1 C) (%) | Rate characteristics (2 C/0.2 C) (%) |
|---|---|---|
| Manufacture Example 1 | 88 | 85 |
| Comparative Manufacture Example 1 | 86 | 83 |

Referring to Table 5, the coin cell manufactured in Manufacture Example 1 was found to have improved rate characteristics, compared to the coin cell of Comparative Manufacture Example 1.

Evaluation Example 5: Scanning Electron Microscopy (SEM)

Figure 5A:
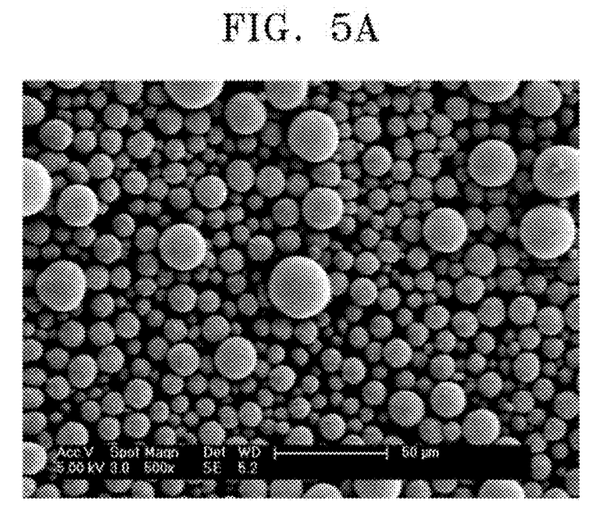
FIGS. 5A to 5C illustrate scanning electron microscope (SEM) images of the cobalt oxide prepared in Example 1.
Figure 5B:
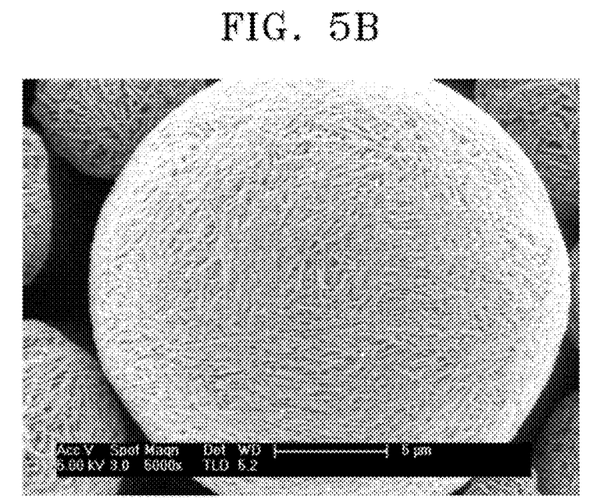
Figure 5C:
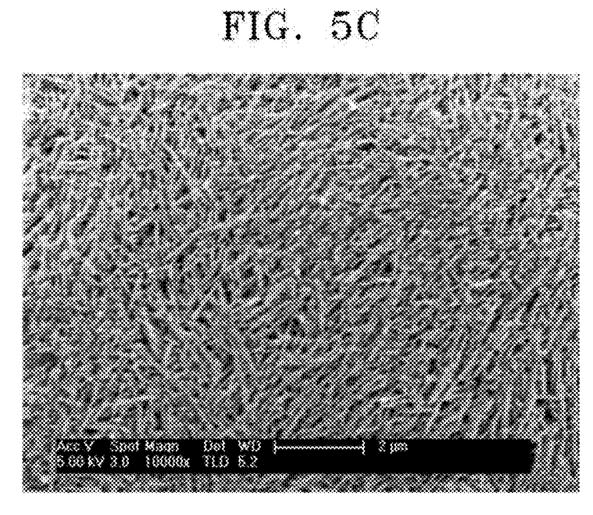
Figure 6A:
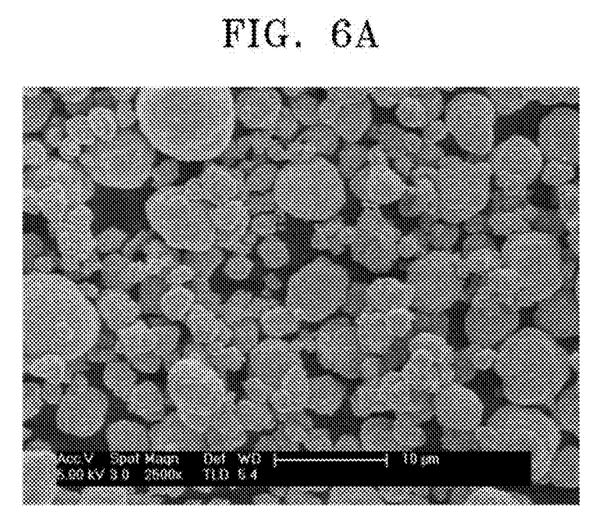
FIGS. 6A and 6B illustrate SEM images of the cobalt oxide prepared in Comparative Example 1.
Figure 6B:
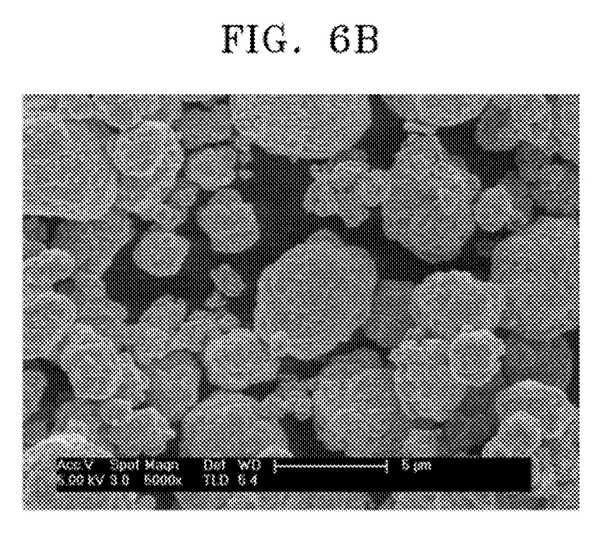

The cobalt oxides prepared in Example 1 and Comparative Example 1 were analyzed by scanning electron microscopy (SEM). FIGS. 5A to 5C illustrate SEM images of the cobalt oxide of Example 1, and FIGS. 6A and 6B illustrate SEM images of the cobalt oxide of Comparative Example 1.

Referring to the SEM images of the two cobalt oxides, the cobalt oxide of Example 1 was found to have a different shape from that of the cobalt oxide prepared in Comparative Example 1. The cobalt oxide of Example 1 was found to have a needle-like primary particle shape, including spots, and a spherical secondary particle shape having a particle diameter of about 15 μm to about 17 μm.

Evaluation Example 6: Particle Size Distribution Test

1) Cobalt Oxide

Particle size distributions of the cobalt oxides prepared in Example 1 and Comparative Example 1 were analyzed by dynamic light scattering. To evaluate the particle size distribution, D10, D90, and D50 were calculated on a volume basis of particles by dry laser diffraction particle size analysis. The results of the particle size distribution analysis are shown in Table 6.

TABLE 6

| Example | D10 (μm) | D90 (μm) | D50 (μm) | tap density (g/cc) |
|---|---|---|---|---|
| Example 1 | 6.73 | 23.3 | 16.2 | 2.9 |
| Comparative Example 1 | 2.6 | 8.8 | 5.4 | 1.7 |

Referring to Table 6, the cobalt oxide of Example 1 was found to have a larger average particle diameter (D50) and a larger tap density, compared to the cobalt oxide of Comparative Example 1.

2) Lithium Cobalt Oxide

Particle size distributions of the lithium cobalt oxides prepared in Example 1 and Comparative Example 1 were analyzed by dynamic light scattering. To evaluate the particle size distribution, D10, D90, and D50 were calculated on a volume basis of particles by dry laser diffraction particle size analysis. The results of the particle size distribution analysis are shown in Table 7.

TABLE 7

| Example | D10 (μm) | D90 (μm) | D50 (μm) |
|---|---|---|---|
| Example 1 | 12.1 | 37.6 | 23 |
| Comparative Example 1 | 8.5 | 34.18 | 17.93 |

Referring to Table 7, the lithium cobalt oxide of Example 1 was found to have a larger average particle diameter (D50), compared to the lithium cobalt oxide of Comparative Example 1.

As described above, according to the one or more embodiments, a lithium cobalt oxide with improved density may be prepared using a cobalt oxide according to an embodiment. An electrode containing the lithium cobalt oxide may have improved density characteristics. A lithium secondary battery with improved lifetime characteristics and rate characteristics may be manufactured using the electrode.

By way of summation and review, lithium cobalt oxide has high energy density per volume, and thus may be used as a positive active material. To further improve the capacity of lithium cobalt oxide, lithium cobalt oxide may have increased density.

The embodiments may provide a cobalt oxide with improved density for use in a lithium secondary battery.

The embodiments may provide a lithium cobalt oxide formed from the cobalt oxide, and a lithium secondary battery having improved cell performance by including a positive electrode containing the lithium cobalt oxide.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of preparing $Co_3O_4$ that has an average particle diameter (D50) of about 15 μm to about 18 μm, a particle diameter (D90) of about 23 μm to about 25 μm, and a particle diameter (D10) of about 5 μm to about 7 μm, the method consisting essentially of:

performing a precipitation reaction of a mixture including a cobalt precursor and a precipitant, the precipitation reaction being carried out under an oxidizing gas atmosphere to obtain the $Co_3O_4$, wherein the precipitation reaction of the mixture is performed at a pH of about 11.0 to about 12.0 and a temperature of 70° C. to 80° C., and wherein the $Co_3O_4$ is not thermal-treated.

2. The method as claimed in claim 1, further comprising washing and sieving a reaction product after the reacting under the oxidizing gas atmosphere.

3. The method as claimed in claim 1, wherein the cobalt precursor is cobalt sulfate.

4. The method as claimed in claim 1, wherein the precipitation reaction of the mixture is performed at a pH of 11.5 to 12.0.

5. A $Co_3O_4$ for a lithium secondary battery, the $Co_3O_4$ being prepared according to the method as claimed in claim 1 and having:

a tap density of about 2.8 g/cc to about 3.0 g/cc, and an intensity ratio of about 0.8 to about 1.2 of a second peak at 2θ of about 31.3±1° to a first peak at 2θ of about 19±1° in X-ray diffraction spectra, as analyzed by X-ray diffraction.

* * * * *